(12) United States Patent
Abe et al.

(10) Patent No.: US 7,685,610 B2
(45) Date of Patent: Mar. 23, 2010

(54) DISK DEVICE WITH RESTRICTING MECHANISM FOR DRIVING UNIT

(75) Inventors: Hiroshi Abe, Iwaki (JP); Ken Fujinaga, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 453 days.

(21) Appl. No.: 11/542,677

(22) Filed: Oct. 2, 2006

(65) Prior Publication Data

US 2007/0081270 A1   Apr. 12, 2007

(30) Foreign Application Priority Data

Oct. 3, 2005   (JP) ............................. 2005-290454

(51) Int. Cl.
*G11B 17/03* (2006.01)
*G11B 33/02* (2006.01)

(52) U.S. Cl. ...................... 720/604; 720/614; 720/622; 720/703

(58) Field of Classification Search ................. 720/639, 720/657, 601–615, 619–623, 636–638, 703–713
See application file for complete search history.

(56) References Cited

U.S. PATENT DOCUMENTS 5,970,044 A * 10/1999 Kambayashi et al. ....... 720/713

| | | | |
|---|---|---|---|
| 2003/0072243 A1* | 4/2003 | Yeh et al. | 369/75.2 |
| 2003/0185112 A1* | 10/2003 | Takizawa et al. | 369/30.77 |
| 2004/0057349 A1 | 3/2004 | Nishida et al. | |
| 2004/0177363 A1* | 9/2004 | Murotani | 720/619 |
| 2007/0011697 A1* | 1/2007 | Kido | 720/713 |

FOREIGN PATENT DOCUMENTS

| JP | 63-149453 | 10/1988 |
|---|---|---|
| JP | 10-003731 | 1/1998 |
| JP | 11-232753 | 8/1999 |
| JP | 2001-056998 | 2/2001 |
| JP | 2001-351307 | 12/2001 |
| JP | 2003-257115 | 9/2003 |
| JP | 2004-63017 | 2/2004 |

\* cited by examiner

*Primary Examiner*—Andrea L Wellington
*Assistant Examiner*—Gustavo Polo
(74) *Attorney, Agent, or Firm*—Brinks Hofer Gilson & Lione (57) ABSTRACT

A disk device includes a driving unit and a restricting mechanism that are disposed in a housing. The driving unit moves between a withdrawal position and a driving position. The withdrawal position is separated from an outer peripheral edge of a disk that is positioned in the housing, and the driving position is where the disk is rotationally driven. When the driving unit is at the withdrawal position, the restricting mechanism restricts movement of the driving unit toward the driving position.

14 Claims, 7 Drawing Sheets

DISK DEVICE WITH RESTRICTING MECHANISM FOR DRIVING UNIT

BACKGROUND OF THE INVENTION

Related Applications

The present application claims priority to Japanese Patent Application Number 2005-290454, filed Oct. 3, 2005, the entirety of which is hereby incorporated by reference.

1. Field of the Invention

The present invention relates to a disk device having a driving unit pivotally supported by a unit supporting base.

2. Description of the Related Art

A disk changing device that selects a disk to be subjected to a reproducing operation from a plurality of disks is disclosed in Japanese Unexamined Patent Application Publication No. 2004-63017 (hereunder referred to as "publicly known document").

In this disk changing device, a rotary member pivots an optical pickup unit (having, for example, a turntable) between a driving position where a disk is drivable and a withdrawal position where the optical pickup unit is separated from an outer periphery of the disk.

In the disk changing device of the publicly known document, a mechanism that prevents the movement of the optical pickup unit to the driving position when the optical pickup unit is at the withdrawal position is not described. Therefore, when a waiting state is set in which a disk is not accommodated in the disk changing device or when the disk changing device is transported, the optical pickup unit can be moved toward the driving position by, for example, external vibration.

When the tray that accommodates a disk to be subjected to a reproducing operation is moved to a transportation position (at a height that allows the reproducing operation), for example, external vibration can move the optical pickup unit to the driving position, causing the optical pickup unit to collide with the tray while the tray is moving and to obstruct the movement of the tray. In addition, this collision may damage the optical pickup unit and the tray. Further, since the optical pickup unit can move to the driving position by an external force, such as external vibration, a sudden load is applied to, for example, the rotary member. This may damage, for example, the rotary member.

SUMMARY OF THE INVENTION

Accordingly, the present invention makes it possible to overcome the aforementioned problems and has as an object the provision of a disk device which can reliably prevent movement of a driving unit toward a driving position.

According to the present invention, there is provided a disk device comprising a driving unit and a restricting mechanism. The driving unit is disposed in a housing and moves between a withdrawal position and a driving position. The withdrawal position is separated from an outer peripheral edge of a disk that is positioned in the housing, and the driving position is where the disk is rotationally driven. The restricting mechanism moves between a restriction position and a restriction-removed position. The restriction position is where the movement of the driving unit at the withdrawal position toward the driving position is prevented. The restriction-removed position is where the driving unit at the withdrawal position is allowed to move toward the driving position.

In the above-described structure, even if, for example, external to reliably restrict the position of the driving unit and to, thus, reliably prevent the vibration is applied when, for example, the disk device is transported, it is possible movement of the driving unit toward the driving position. As a result, it is possible to prevent the driving unit from colliding with a disk or any other member.

In the above-described structure, it is desirable that the disk device further comprise a driving member that is disposed in the housing and that is moved by the power of a motor, and that the moving force of the driving member move the driving unit between the withdrawal position and the driving position and move the restricting mechanism between the restriction position and the restriction-removed position.

By virtue of such a structure, it is possible to easily and reliably control the movement of the restricting mechanism and the movement of the driving unit, so that it is possible to smoothly perform the operations of moving the restricting mechanism to the restriction-removed position and then of pivoting the driving unit to the driving position. In addition, a common driving member can be used as a driving member that moves the restricting mechanism and that pivots the driving unit, so that manufacturing costs can be reduced due to the smaller number of parts.

For example, the driving unit may pivot from the withdrawal position to the driving position with a base portion of the driving unit being a rotational fulcrum, and the restricting mechanism may comprise a restricting convex portion and a restricting protrusion. Here, the restricting convex portion may be provided at a free end side of the driving unit, and the restricting protrusion may move between the restriction position opposing the restricting convex portion and the restriction-removed position separated from the restricting convex portion. In addition, the restricting protrusion may oppose the restricting convex portion to prevent the pivoting of the driving unit toward the driving position.

In the present invention, it is desirable that the disk device further comprise a movable guide that guides the free end side of the driving unit when the driving unit pivots between the withdrawal position and the driving position, and that the restricting protrusion move between the restriction position and the restriction-removed position through a link mechanism that operates the movable guide.

By virtue of such a structure, since the operation of a common mechanism, called the link mechanism, moves the restricting protrusion and the movable guide, it is possible to smoothly perform the operations of moving the restricting protrusion to the restriction-removed position and of moving the movable guide.

Further, when the link mechanism is operated by the moving force of the driving member, it is possible to easily control the movement of the restricting mechanism, control the movement of the driving unit, and control the movement of the movable guide at a good timing.

In the above-described structure, it is desirable that the disk device further comprise a lever that is rotated by the link mechanism, the restricting protrusion be provided at a rotational end of the lever, and the link mechanism operate to rotate the lever, thereby moving the restricting protrusion between the restriction position and the restriction-removed position.

By virtue of such a structure, since the restricting protrusion is moved by the rotation of the lever that is operated by the link mechanism, it is possible to move the restricting protrusion by a simple mechanism.

In the above-described structure, it is desirable that the disk device further comprise a secured guide that catches and holds the free end side of the driving unit when the driving unit is at the withdrawal position, and that, when the restricting protrusion is moved to the restriction-removed position, the restricting protrusion be accommodated in a cut portion disposed in the secured guide.

By catching and holding the free end side of the driving unit at the withdrawal position by the secured guide, rattling of the driving unit is restricted.

Further, it is possible that the secured guide have a secured guide edge that is disposed along an arcuate locus whose center of curvature coincides with the rotational fulcrum of the driving unit, the free end side of the driving unit at the withdrawal position be caught and held by the secured guide edge, and the driving unit at the withdrawal position be pivoted toward the driving position after being guided by the secured guide edge.

By virtue of the aforementioned structure, the operation of the driving unit that starts pivoting from the withdrawal position toward the driving position is stabilized.

In this case, it is more desirable that the disk device further comprise a movable guide that guides the free end side of the driving unit that disengages from the secured guide edge of the secured guide and pivots toward the driving position, and the movable guide have a movable guide edge that is disposed along an arcuate locus whose center of curvature coincides with the rotational fulcrum of the driving unit. Here, it is desirable that, when the driving unit pivots from the withdrawal position to the driving position, the free end side of the driving unit be received by the movable guide edge of the movable guide from the secured guide edge of the secured guide.

By virtue of the aforementioned structure, the operation of the driving unit that pivots from the withdrawal position toward the driving position is stabilized.

It is possible that the movable guide have a holding recess that is disposed continuously with the movable guide edge, and that, when the driving unit is pivoted to the driving position, the free end side of the driving unit be held by the holding recess.

By virtue of such a structure, it is possible to stably hold the driving unit at the driving position.

The present invention is applicable not only to a disk device that accommodates only one disk in the housing, but also to a disk device comprising a plurality of supporting members, a supporting-member-selecting mechanism, and a driving unit, which are disposed in a housing. The supporting members are disposed so as to overlap each other in a disk axial direction and are capable of supporting disks. The supporting-member-selecting mechanism increases a distance between the supporting member that is selected and a supporting member adjacent thereto. The driving unit moves between a withdrawal position and a driving position. The withdrawal position is separated from an outer peripheral edge of the disk that is supported by each supporting member, and the driving position is where each disk is rotationally driven.

In the disk devices according to the present invention, it is possible to reliably prevent the movement of the driving unit toward the driving position.

DESCRIPTION OF THE PREFERRED EMBODIMENTS

Figure 1A:
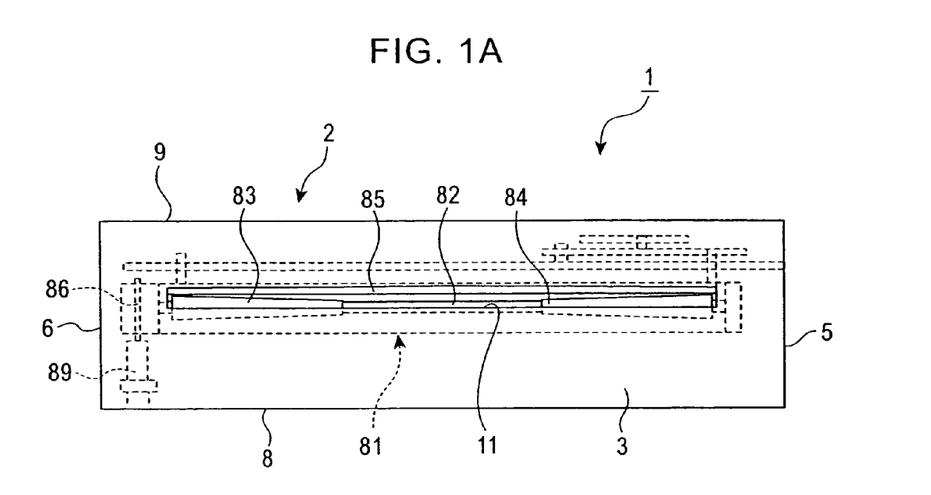
FIGS. 1A and 1B are front views of a disk device according to an embodiment of the present invention as viewed from a front side of a housing, with FIG. 1A mainly showing a transporting unit in the housing and FIG. 1B mainly showing a supporting member, supporting-member-selecting means, and a driving unit.
Figure 1B:
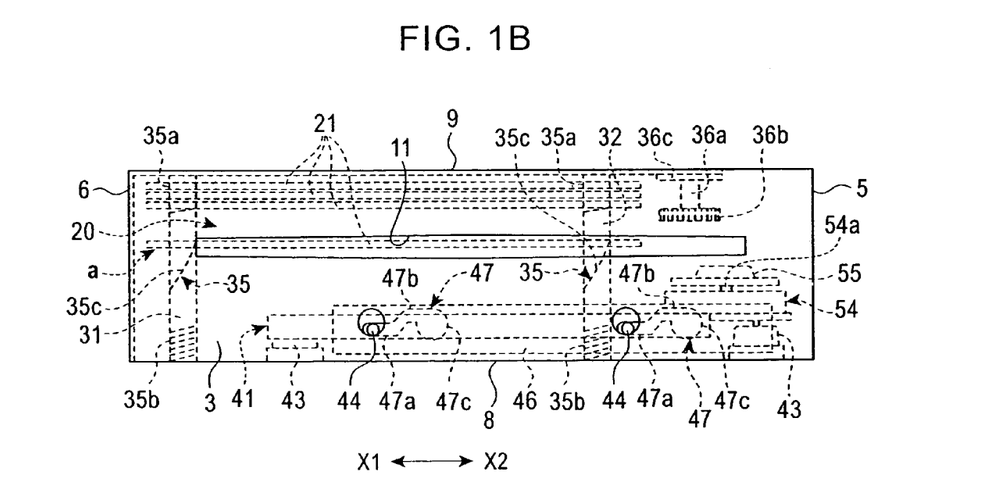
Figure 2:
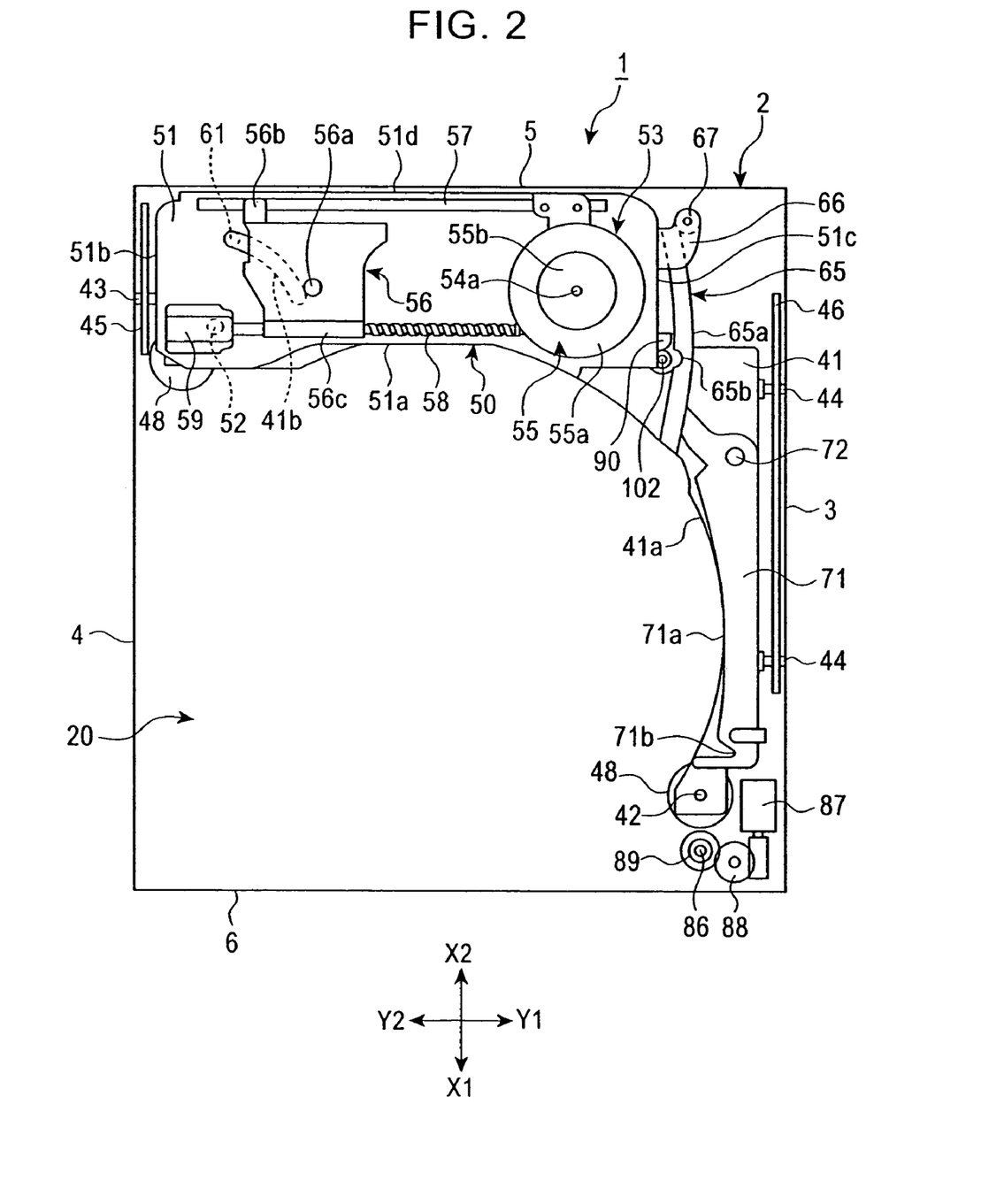
FIG. 2 is a plan view of the driving unit and a unit supporting base disposed in the housing.

A disk device 1 according to the embodiment includes a box-shaped housing 2. The housing 2 has a front surface 3, a bottom surface 8, and a top surface 9, which are shown in FIGS. 1A and 1B, and a rear surface 4, a right side surface 5, and a left side surface 6, which are shown in FIG. 2. A loading slot 11 that is in the form of a slit is formed in the front surface 3, and a disk D is inserted into the housing 2 through the slot 11.

Figure 6:
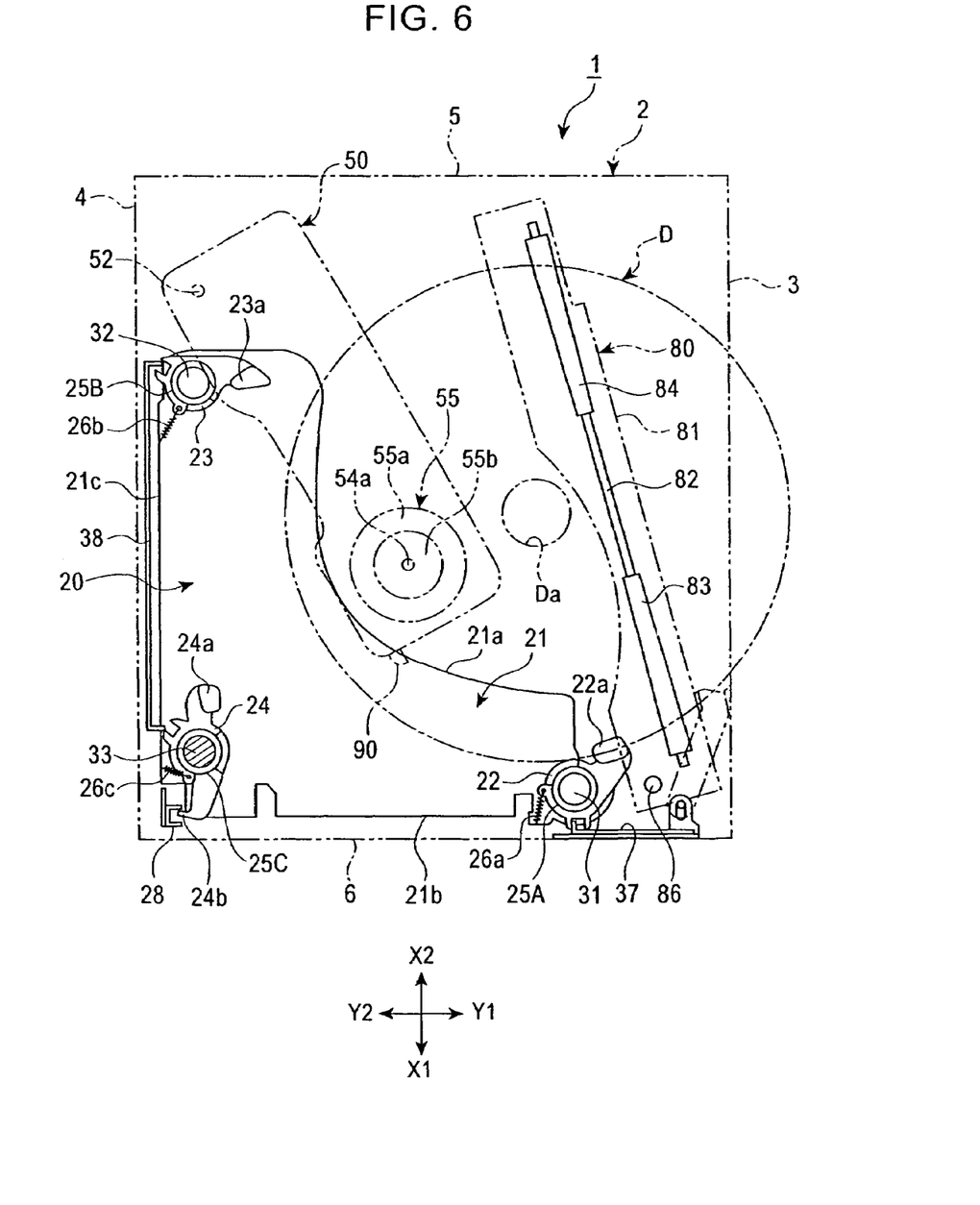
FIG. 6 is a plan view illustrating transportation of a disk to a supporting member.
Figure 7:
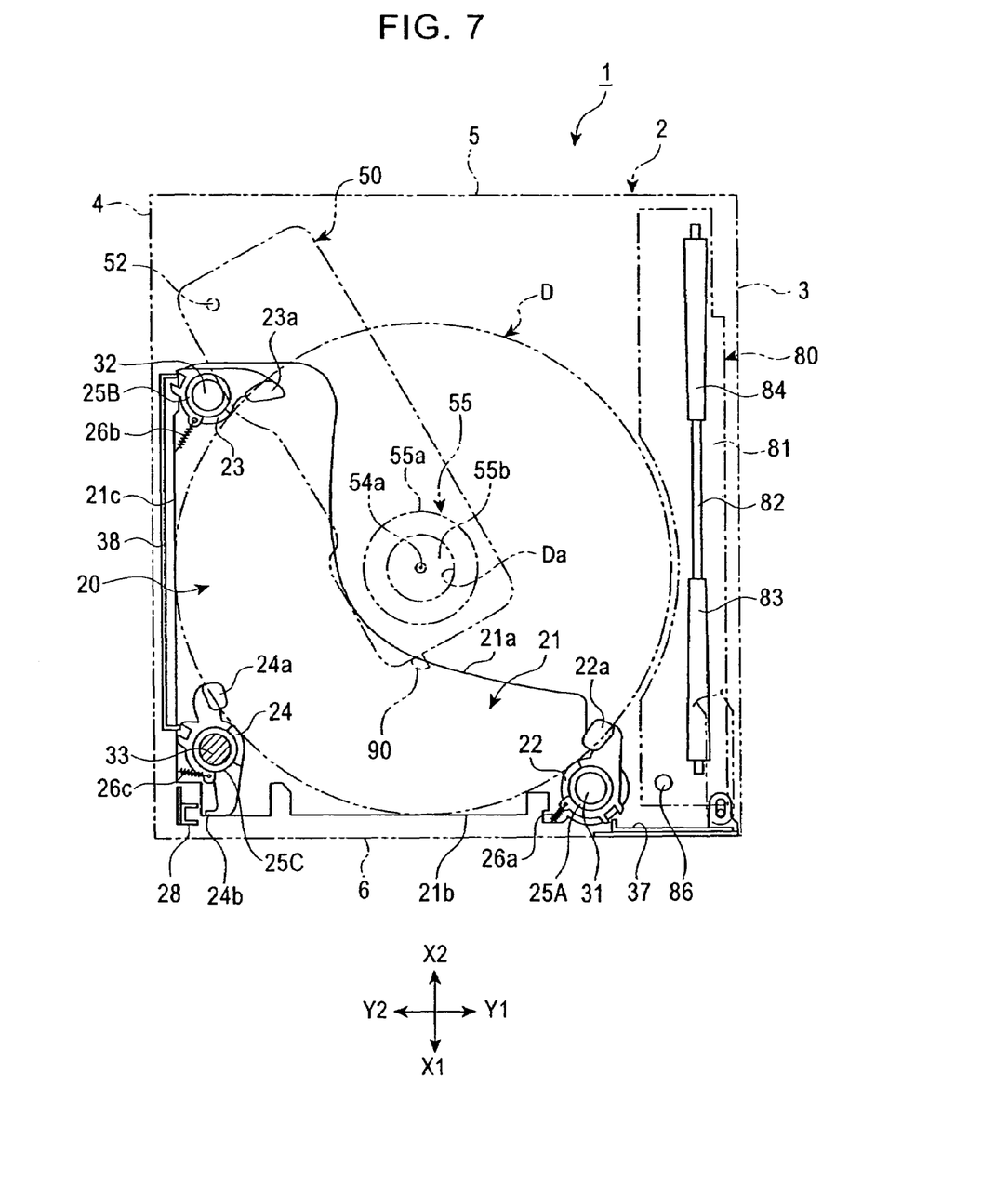
FIG. 7 is a plan view showing a state in which the disk is held by the supporting member.

As shown in FIGS. 6 and 7, in the housing 2, an area that is surrounded by the rear surface 4, the left side surface 6, the bottom surface 8, and the top surface 9 is a disk accommodation area 20.

As shown in FIG. 1B and FIGS. 6 and 7, in the disk accommodation area 20, three selection shafts 31, 32, and 33 are rotatably supported by the top surface 9, and the bottom ends of the selection shafts 31, 32, and 33 have lengths that allow them to contact the bottom surface 8 of the housing 2.

As shown in FIG. 1B, spiral-shaped selection grooves 35 are formed in the outer peripheral surfaces of the selection shafts 31, 32, and 33, respectively. The spirals of the selection grooves 35 at the upper portions of the respective selection shafts 31, 32, and 33 are included in small-pitch portions 35a and the spirals at the lower portions of the respective selection shafts 31, 32, and 33 are included in small-pitch portions 35b. At the upper small-pitch portions 35a and the lower small-pitch portions 35b, the spirals of the selection grooves 35 are formed with small pitches, and each upper small-pitch portion 35a and each lower small-pitch portion 35b have at least five spirals (corresponding to five pitches). At intermediate portions of the selection shafts 31, 32, and 33 in a vertical direction, the selection grooves 35 have large-pitch portions 35c. At each large-pitch portion 35c, the selection groove 35 has one spiral (corresponding to one pitch) between the upper small-pitch portion 35a and the lower small-pitch portion 35b.

Small gears (not shown) are integrally formed with the top ends of the respective selection shafts 31, 32, and 33. A large-diameter annular gear (not shown) is provided at the inner side of the top surface 9, and all of the small gears engage the annular gear. As shown in FIG. 1B, a driving shaft 36a is rotatably supported by the top surface 9, a transmission gear 36b is integrally formed with the bottom end of the driving shaft 36a, and a thin gear 36c is integrally formed with the top end of the driving shaft 36a. The thin gear 36c engages the annular gear. When the power of a selection motor (not shown) is applied to the transmission gear 36b, the thin gear 36c rotationally drives the annular gear, so that all of the selection shafts 31, 32, and 33 rotate in synchronism through their small gears. In this embodiment, the selection shafts 31, 32, and 33, the annular gear, the transmission gear 36b, etc. constitute a supporting-member-selecting mechanism.

A plurality of supporting members 21 that can support disks D, respectively, are provided in the disk accommodation area 20. In the embodiment, there are six of the supporting members 21 that are placed one above the other in the axial direction (vertical direction) of the disks D. Each supporting member 21 has a left side edge 21b, which opposes and is substantially parallel with the left side surface 6 of the housing 2, and a rear edge 21c, which opposes and is substantially parallel with the rear surface 4 of the housing 2. An inner edge 21a of each supporting member 21 facing an inward direction of the housing 2 has a concave shape.

A bearing 25A is secured to an X1-and-Y1 end of each supporting member 21. A bearing 25B is secured to an X2-and-Y2 end of each supporting member 21. A bearing 25C is secured to an inner side of a corner formed by the left edge 21b and the rear edge 21c of each supporting member 21. Each bearing 25A is placed over the outer periphery of the selection shaft 31, each bearing 25B is placed over the outer periphery of the selection shaft 32, and each bearing 25C is placed over the outer periphery of the selection shaft 33.

Protruding catch portions having the form of short shafts are integrally formed with the inner peripheral edges of the bearings 25A, 25B, and 25C. The catch portions are slidably inserted into the selection grooves 35 formed in the outer peripheries of the selection shafts 31, 32, and 33. This causes the six supporting members 21 to be caught by adjacent spirals of the selection grooves 35. When the selection shafts 31, 32, and 33 are rotated counterclockwise in FIG. 7, the supporting members 21 are transported downward one at a time along the selection shafts 31, 32, and 33. In contrast, when the selection shafts 31, 32, and 33 are rotated clockwise, the supporting members 21 are transported upward one at a time along the selection shafts 31, 32, and 33. Then, any one of the supporting members 21 that is caught by the large-pitch portions 35c of the selection grooves 35 can reach a selection position (a) shown in FIG. 1B, and the distance between the supporting member 21 at the selection position (a) and the supporting members 21 therebelow that are positioned at the small-pitch portions 35b is increased.

The supporting member 21 that reaches the selection position (a) show in FIG. 1B is set at a height that is the same as the height of the loading slot 11.

As shown in FIGS. 6 and 7, holding members 22 are pivotally supported by the outer peripheries of the bearings 25A at the respective supporting members 21. Each holding member 22 has a holding pawl 22a. Holding members 23 are pivotally supported by the outer peripheries of the respective bearings 25B. Each holding member 23 has a holding pawl 23a. Holding members 24 are pivotally supported by the outer peripheries of the respective bearings 25C. Holding pawls 24 are integrally formed with the respective holding members 24.

Extension springs 26a are provided between the holding members 22 and the respective supporting members 21, and the holding members 22 are urged counterclockwise in the figures. As shown in FIG. 7, when the holding members 22 are pivoted counterclockwise, they are at their holding positions, so that the disks D can be held between the supporting members 21 and the respective holding pawls 22a. Extension springs 26b are provided between the holding members 23 and the respective supporting members 21, and the holding members 23 are urged clockwise in the figures. When the holding members 23 are pivoted clockwise, they are at their holding positions, so that the disks D can be held between the holding pawls 23a and their respective supporting members 21.

Extension springs 26c are provided between the holding members 24 and the respective supporting members 21, and the holding members 24 are urged clockwise. In FIG. 6, the illustrated holding member 24 is maximally pivoted clockwise. As shown in FIG. 7, when the disks D are held by the supporting members 21, the holding members 24 pivot slightly counterclockwise. In FIG. 7, the illustrated holding member 24 is at its holding position, so that the disk D can be held between the holding pawl 24a and the supporting member 21.

A loading detector 28 is provided at a corner formed by the rear surface 4 and the left side surface 6 of the housing 2. The load detector 28 has a light-emitting element and a light-receiving element opposing each other. As shown in FIG. 6, when the supporting member 21 at the selection position (a) does not hold a disk D, a detection portion 24b that is provided with the holding member 24 moves into a location between the light-receiving element and the light-emitting element, so that detection output of the load detector 28 is set to "off". As shown in FIG. 7, when the supporting member 21 at the selection position (a) holds a disk D, the holding member 24 is pushed by the outer peripheral edge of the disk D and is slightly pivoted counterclockwise. Therefore, the detection portion 24b moves out of the loading detector 28, so that the detection output of the loading detector 28 is set to "on".

As shown in FIGS. 6 and 7, a first release member 37 is provided at the inner side of the left side surface 6 of the housing 2. When the first release member 37 moves in a direction Y2, the holding member 22 pivots clockwise, so that the holding pawl 22a moves away beyond the outer peripheral edge of the disk D. A second release member 38 is provided at the inner side of the rear surface 4. When the second release member 38 moves in a direction X1, the holding member 23 and the holding member 24 are pivoted counterclockwise, so that the holding pawls 23a and 24a move away beyond the outer peripheral edge of the disk D.

Here, the disk D has a diameter of 12 m, and may be, for example, a compact disk (CD), a CD-ROM, or a digital versatile disk (DVD).

Figure 5:
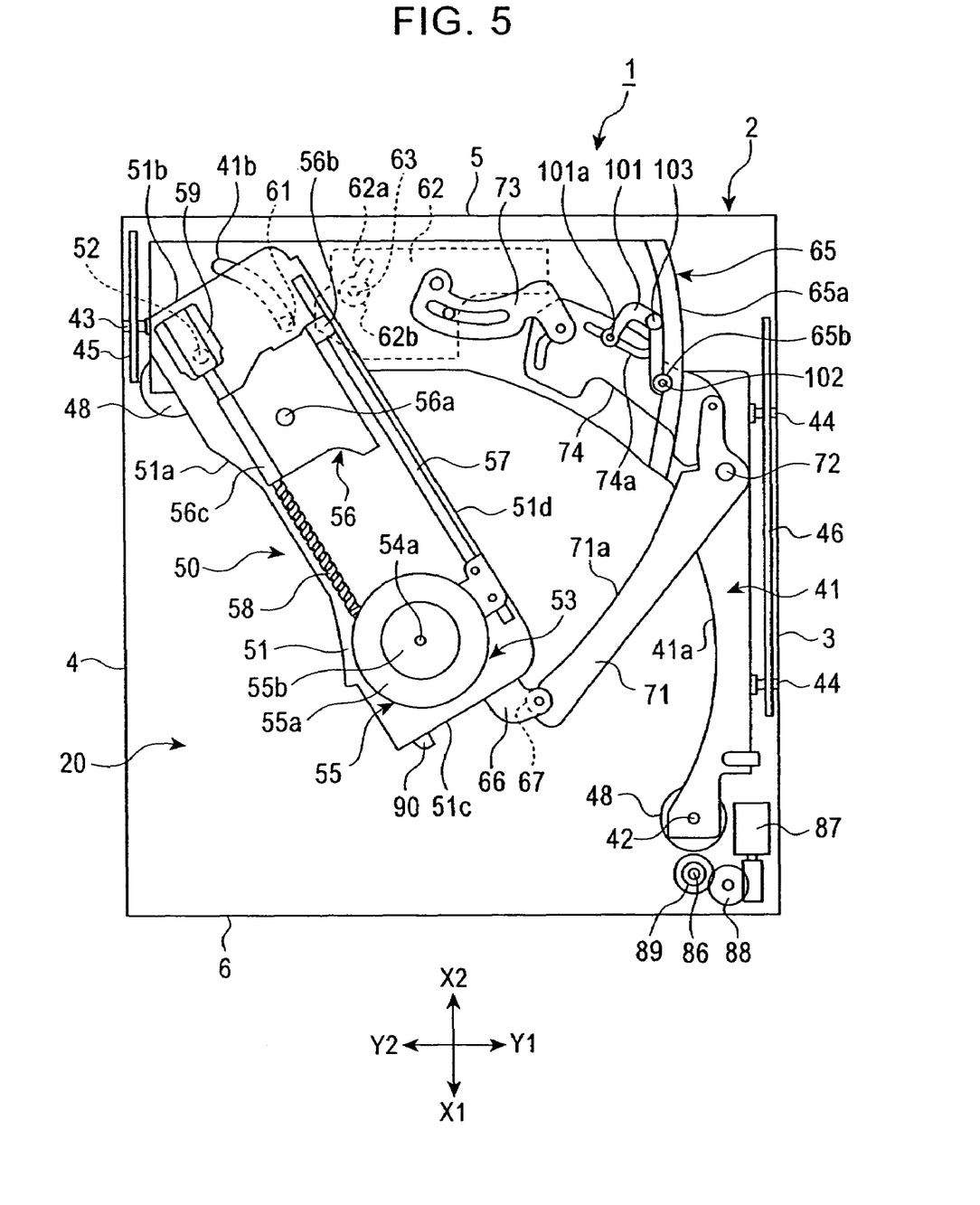
FIG. 5 is a plan view of the driving unit and the unit supporting base disposed in the housing.

As shown in FIGS. 2 and 5, a unit supporting base 41 is provided in the housing 2. The unit supporting base 41 has a form that extends substantially in the form of an L-shape from the inner side of the front surface 3 to the inner side of the right side surface 5. An edge 41a of the unit supporting base 41 facing the inward direction of the housing 2 has a concave shape. The outer peripheral edges of the disks D held by the respective supporting members 21 in the disk accommodation area 20 are positioned slightly inward from the edge 41a.

A plurality of dampers 48, which are resilient supporting members, are secured to the bottom surface 8 of the housing 2. Each damper 48 has gas or liquid, such as oil, sealed in a flexible bag member, such as a rubber bag member. Alternatively, each damper 48 may be a combination of a compression spring and the bag member. A plurality of downwardly facing supporting shafts 42 are secured to the unit supporting base 41, and the supporting shafts 42 are supported by the respective dampers 48.

A lock shaft 43, which protrudes in the Y2 direction, and a pair of lock shafts 44, which protrude in the Y1 direction, are provided with the unit supporting base 41. A lock member 45 that moves in the X1-X2 directions is provided at the inner side of the rear surface 4 of the housing 2, and a lock member 46 that moves in the X1-X2 directions is provided at the inner side of the front surface 3. The lock shaft 43 can engage the lock member 45, and the lock shafts 44 can engage the lock member 46.

As shown in FIG. 1B, a pair of lock holes 47 are formed in the lock member 46. Each lock hole 47 has a downward-movement lock portion 47a, which extends in the X1 direction, a lift-up portion 47b, which is disposed upward from the downward-movement lock portion 47a, and an escape portion 47c, which extends in a direction X2 from the lift-up portion 47b and which has a large opening area. The lock shafts 44 are inserted in the respective lock holes 47. A similar lock hole is also formed in the lock member 45 that is positioned at the inner side of the rear surface 4, and the lock shaft 43 is inserted in the lock hole.

As shown in FIG. 1B, when the lock member 46 is moved in the direction X2, the lock shafts 44 are restricted by the respective downward-movement lock portions 47a, and the dampers 48 are compressed when the unit supporting base 41 moves downward, so that a driving unit 50 that is supported by the top surface of the unit supporting base 41 is also moved downward. As shown in FIG. 1B, at this time, the driving unit 50 is positioned below the lower surface of the disk D that is inserted from the loading slot 11.

As shown in FIGS. 2 and 5, the driving unit 50 is supported by the top surface of the unit supporting base 41. The driving unit 50 has an elongated driving base 51. A downwardly facing supporting shaft 52 is secured to a location close to a rear end 51b and to a left side surface 51a of the driving base 51. The supporting shaft 52 is rotatably supported by the unit supporting base 41. In FIG. 2, the driving unit 50 is placed on the right portion of the unit supporting base 41 and is at a withdrawal position that is separated from the outer peripheral edge of a disk D in the disk accommodation area 20. In FIG. 5, the driving unit 50 is set at a driving position that it reaches as a result of being rotated clockwise around the supporting shaft 52 as a center and along an X-Y plane from the withdrawal position. The driving unit 50 at the driving position moves into a location between a disk D that is held by a supporting member 21 at the selection position (a) and a disk D positioned below this disk D in the disk accommodation area 20.

A rotational driving unit 53 that rotates near the inner side of a front end 51c at the free end side of the driving base 51 is provided with the driving unit 50. The rotational driving unit 53 includes a spindle motor 54 (refer to FIG. 1B), which is secured on the driving base 51, and a turntable 55, which is secured to a driving shaft 54a of the spindle motor 54. The turntable 55 has a flange 55a and a convex portion 55b that protrudes upward from the central portion of the flange 55a.

A clamp mechanism (not shown) is provided with the turntable 55. The clamp mechanism has a clamp pawl that protrudes radially from the outer periphery of the convex portion 55b. When the clamp pawl moves back into the convex portion 55b, the clamp mechanism is in an unclamp state, so that the convex portion 55b can be inserted into a center hole Da of a disk D. When the convex portion 55b is inserted into the center hole Da of the disk D from below the disk D and, then, the clamp pawl protrudes from the convex portion 55b, the peripheral portion of the disk D at the central hole Da is clamped by the flange 55a and the clamp pawl, so that the clamp mechanism is in a clamped state.

An optical head 56 is provided on the driving base 51 of the driving unit 50. The optical head 56 has an objective lens 56a opposing a recording surface of the disk D clamped by the turntable 55. In the optical head 56, for example, a light-emitting element, which applies detection light (a laser beam) to the objective lens 56a, and a light-receiving element, which detects the detection light reflected by the recording surface of the disk D and returning therefrom through the objective lens 56a, are built in.

A guide member 57, which extends along a right side surface 51d, and a rotatable feed screw shaft 58, which extends along a left side surface 51a, are supported on the driving base 51. The guide member 57 and the feed screw shaft 58 extend parallel to each other. A sliding portion 56b is provided with the optical head 56, and is slidably supported by the guide member 57. An engaging portion 56c is also provided with the optical head 56 and engages a groove in the feed screw shaft 58. Therefore, as shown in FIGS. 2 and 5, the rotational force of the feed screw shaft 58 causes the optical head 56 to move between an outer-peripheral-side position, which is separated from the turntable 55, and an inner-peripheral-side position, which is close to the turntable 55.

A sled motor 59 is mounted to the driving base 51. The sled motor 59 is a stepping motor, such as a pulse motor. The feed screw shaft 58 is integrally formed with a rotary shaft of the sled motor 59. Alternatively, the feed screw shaft 58 is directly connected to the rotary shaft motor 59 with a joint.

As shown in FIGS. 2 and 5, an arcuate guide hole 41b passes vertically through the unit supporting base 41. The center of curvature of an arcuate locus of the arcuate guide hole 41b coincides with the axis of the supporting shaft 52. A driving shaft 61 is secured to the lower end at the rear end 51b side of the driving base 51, is slidably inserted in the arcuate guide hole 41b, and protrudes downward with respect to the unit supporting base 41.

A driving member 62 is supported by the lower surface of the unit supporting base 41 so as to be slidable in the Y1-Y2 directions. As shown in FIG. 5, the driving member 62 has a driving slot 62a and an escape portion 62b that are continuously formed with respect to each other. A driving mechanism that is driven by the power of a motor is provided at the upper side of the bottom surface 8 of the housing 2, and a driving pin 63 that is provided at the driving mechanism is inserted into the driving slot 62a and the escape portion 62b. Therefore, the driving member 62 reciprocates in the Y1-Y2 directions by the power of the motor that is provided at the upper side of the bottom surface 8. In this embodiment, the driving member 62, the driving pin 63, and the driving mechanism constitute a unit driving unit that pivots the driving unit 50 between the withdrawal position and the driving position.

The driving shaft 61 that is provided at the driving base 51 of the driving unit 50 is operated either directly by the driving member 62 or through a link mechanism (not shown). When the driving member 62 is moved in the direction Y2 by the driving pin 63 that is in the driving hole 62a, the driving shaft 61 is pushed in the direction Y2 by the driving member 62 or through the link mechanism, so that, as shown in FIG. 2, the driving unit 50 is rotated to the withdrawal position. When the driving member 62 is moved in the direction Y1 by the driving pin 63, as shown in FIG. 5, the driving member 62 pushes the driving shaft 61 in the direction Y1 to move the driving shaft 61 clockwise along the arcuate guide hole 41b, so that the driving unit 50 pivots to the driving position shown in FIG. 5. When a disk D is clamped and rotationally driven by the turntable 55, the driving pin 63 moves into the escape portion 62b to remove the restriction on the driving member 62 by the driving pin 63, so that the unit supporting base 41 that supports the driving member 62 is resiliently supported by the dampers 48.

As shown in FIGS. 2 and 5, a secured guide 65 is secured to and provided with the unit supporting base 41. The secured guide 65 is formed of, for example, a synthetic resin material, and its outer peripheral edge is formed as a secured guide edge 65a. The secured guide edge 65a is formed along an arcuate locus having a center of curvature at the axis of the supporting shaft 52 serving as a rotational fulcrum of the driving unit 50.

A protrusion 66 is secured to the front end 51c of the driving base 51 of the driving unit 50, and a roller 67 is rotatably supported at an end of the protrusion 66. As shown in FIG. 2, when the driving unit 50 is positioned on the unit supporting base 41, the roller 67 engages the secured guide edge 65a of the secured guide 65. A groove whose cross section is V-shaped is formed around the roller 67. When the groove is rollably fitted to the secured guide edge 65a, vertical rattling of the free end side of the driving unit 50 that is situated at the withdrawal position as in FIG. 2 is restricted.

A movable guide 71 is provided on the unit supporting base 41, near the inner side of the front surface 3 of the housing 2. The movable guide 71 is rotatably supported by a shaft 72 that is secured to the unit supporting base 41. The movable guide 71 is formed of a metallic plate or a synthetic resin plate, and its side edge that faces the inward direction of the housing 2 is formed as an arcuate movable guide edge 71a. As shown in FIG. 2, a holding recess 71b that is formed continuously with the movable guide edge 71a is formed near the free end side of the movable guide 71.

As shown in FIG. 5, near the inner side of the right side surface 5 of the housing 2, two link members 73 and 74 are slidably linked to each other at the upper surface of the unit supporting base 41. When the driving member 62 is moved in the direction Y2, the two link members 73 and 74 are operated by the driving member 62 so that, as shown in FIG. 2, the movable guide 71 disengages from the outer peripheral edge of a disk D in the disk accommodation area 20 and is set at the withdrawal position that is close to the front surface 3 of the housing 2.

When the driving member 62 is moved in the direction Y1, the link members 73 and 74 are operated by the driving member 62 so that the movable guide 71 pivots clockwise from the withdrawal position shown in FIG. 2. At this time, the movable guide 71 is set so as to match the arcuate locus having the center of curvature at the axis core of the supporting shaft 52. The roller 67, which is provided at the front end of the driving unit 50 that pivots clockwise from the withdrawal position, is received by the movable guide edge 71a of the movable guide 71 from the secured guide edge 65a of the secured guide 65, and the groove at the outer periphery of the roller 67 engages the movable guide edge 71a, so that the free end side of the driving unit 50 moves along the movable guide edge 71a while vertical rattling of the free end side of the driving unit 50 is restricted. Then, as shown in FIG. 5, when the driving unit 50 reaches the driving position, the movable guide 71 is further pivoted clockwise, so that the roller 67 is held by the holding recess 71b at the end of the movable guide 71.

Figure 3A:
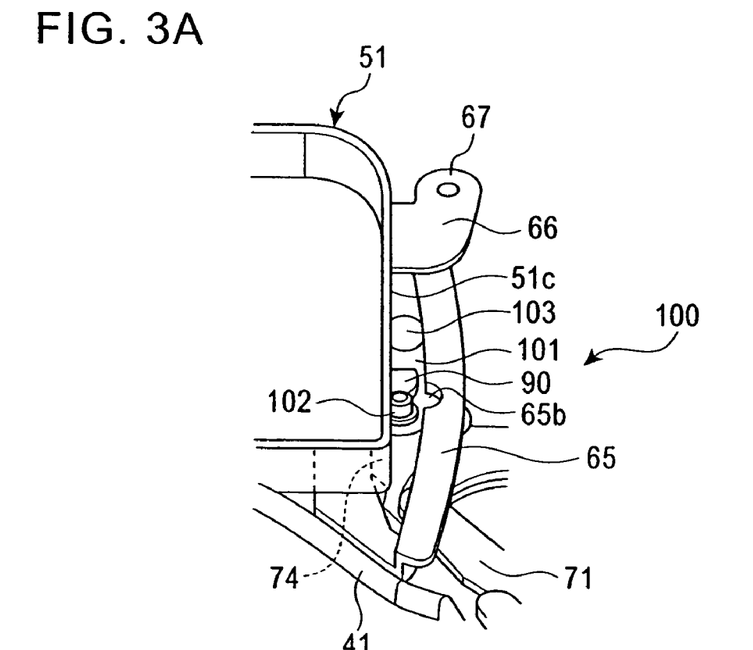
FIGS. 3A and 3B are partial enlarged views of a restricting mechanism according to the present invention, with FIG. 3A showing a state in which movement of the driving unit is restricted and FIG. 3B showing a state in which the restriction on the driving unit is removed.
Figure 3B:
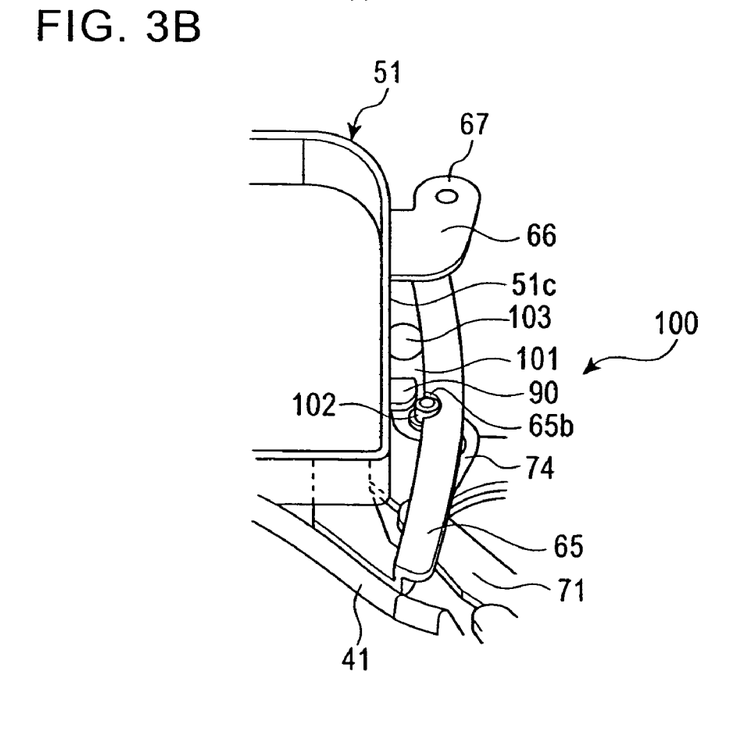

As shown in FIG. 2, and FIGS. 3A and 3B, a restricting convex portion 90 that protrudes outward from the driving base 51 is provided at the front end 51c at the free end side of the driving base 51. A restricting protrusion 102 is provided at a movable end of a lever 101 (described later) so as to protrude upward. In this embodiment, the restricting convex portion 90, the lever 101, and the restricting protrusion 102 constitute a restricting mechanism 100.

The restricting protrusion 102 is moved between a restriction position shown in FIG. 3A and a restriction-removed position shown in FIG. 3B by the lever 101. When the restricting protrusion 102 is at the restriction position shown in FIG. 3A, the restricting protrusion 102 opposes an X1-side side surface of the restricting convex portion 90, so that the movement of the driving unit 50 toward the driving position is restricted. In contrast, when the restricting protrusion 102 is at the restriction-removed position shown in FIG. 3B, the restricting protrusion 102 does not restrict the restricting convex portion 90, that is, the protrusion 102 is accommodated in a cut portion 65b of the secured guide 65 and is spaced from the outer periphery of the restricting convex portion 90. Therefore, the positional restriction on the restricting convex portion 90 is removed, thereby allowing the driving unit 50 to pivot toward the driving position.

Next, a mechanism for moving the restricting protrusion 102 will be described.

Figure 4:
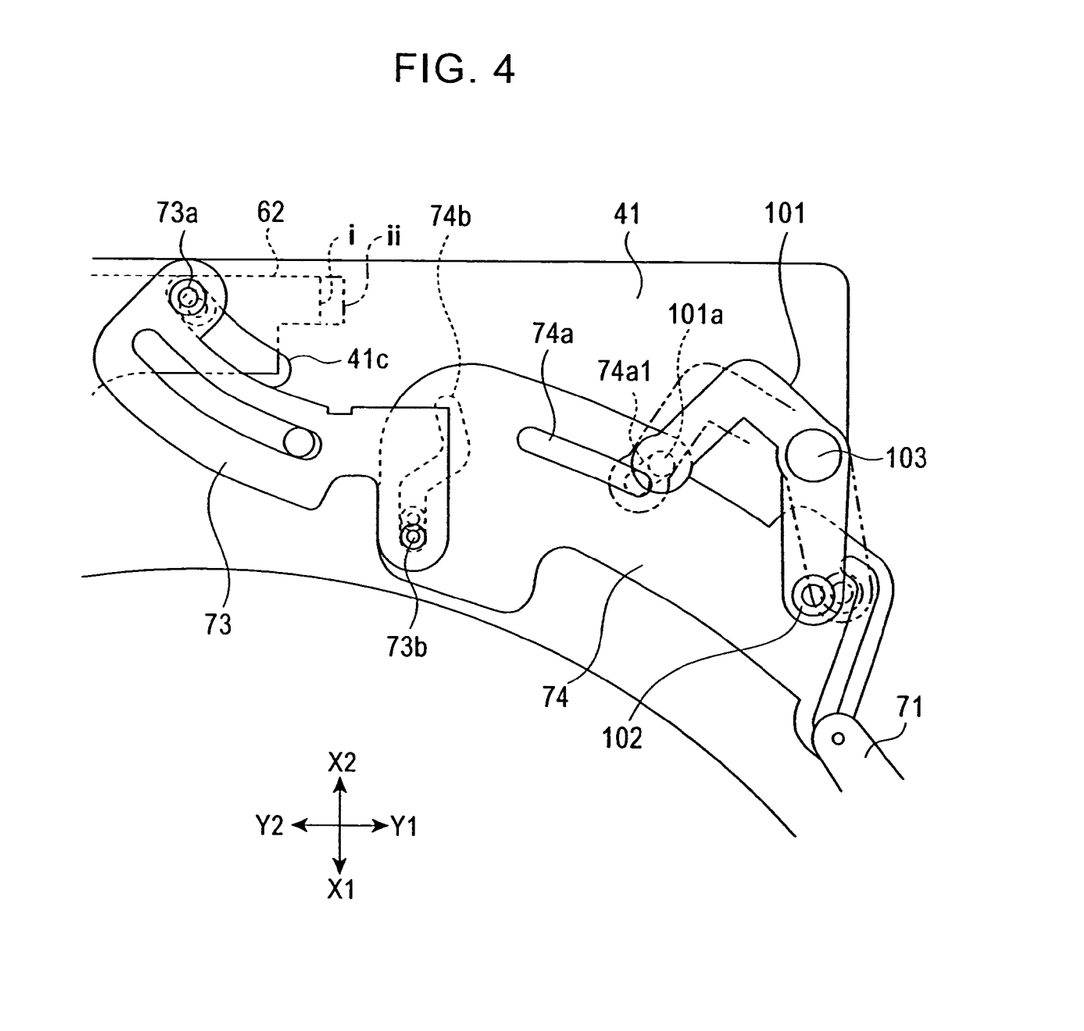
FIG. 4 is a partial enlarged view of a mechanism that moves a restricting protrusion.

As shown in FIG. 4, the restricting protrusion 102 is provided at the movable end of the lever 101, and the lever 101 is rotatably secured to the unit supporting base 41 by a securing pin 103.

A slide groove 74a is formed in the link 74, and a slide pin 101a, formed at the lever 101, is slidably inserted in the slide groove 74a. When the slide pin 101a slides in the slide groove 74a, the lever 101 rotates around the securing pin 103 serving as a rotational fulcrum. The rotation of the lever 101 causes the restricting protrusion 102 to move between the restriction position shown in FIG. 3A and the restriction-removed position shown in FIG. 3B.

As shown in FIGS. 1A, 6, and 7, a transfer unit 80 is provided in the housing 2. A unit frame 81 is provided with the transfer unit 80. A roller shaft 82 is rotatably supported in the unit frame 81. Two transfer rollers 83 and 84 are provided with the roller shaft 82 so as to be spaced apart from each other in the axial direction. As shown in FIG. 1A, a clamping member 85, which faces the top sides of the transfer rollers 83 and 84, is provided in the unit frame 81. The transfer rollers 83 and 84 and the clamping member 85 are pressed in contact to each other by a spring force.

As shown in FIGS. 6 and 7, in the housing 2, a supporting shaft 86 is secured near the inner side of the left side surface 6, and an X1-side end of the unit frame 81 is rotatably supported by the supporting shaft 86. A unit switching mechanism (not shown) pivots the transfer unit 80 from a waiting position (shown in FIG. 7) that is close to the inner side of the front surface 3 to a transfer position (shown in FIG. 6) which the transfer unit 80 reaches after pivoting counterclockwise. When the transfer unit 80 is at the waiting position shown in FIG. 7, it is separated from the outer peripheral edge of a disk D accommodated in the disk accommodation area 20. In contrast, when the transfer unit 80 is at the transfer position shown in FIG. 6, a portion of the transfer unit 80 overlaps the disk D in the disk accommodation area 20. As shown in FIG. 1A, the transfer unit 80 is set at a height that allows the transfer rollers 83 and 84 and the clamping member 85 to clamp a disk D inserted through the slot 11.

As shown in FIGS. 2 and 5, a roller motor 87 is provided on the bottom surface 8 of the housing 2. Power of the roller motor 87 is reduced in speed by a reduction gear 88 and is transmitted to a transmission gear 89 that is rotatably supported by the supporting shaft 86. The rotary force of the transmission gear 89 is transmitted to the roller shaft 82, thereby rotationally driving the transfer rollers 83 and 84. Therefore, it is possible to rotate the transfer rollers 83 and 84 by the roller motor 87 independently of the movement of the transfer unit 80.

Next, the operation of the disk device 1 will be described.

As shown in FIG. 7, at the supporting members 21 in the disk accommodation area 20, the holding members 22 are pivoted counterclockwise by the respective extension springs 26a, and the holding members 23 and 24 are pivoted clockwise by the respective extension springs 26b and 26c. Accordingly, when the disks D are supplied to the respective supporting members 21, the outer peripheral edges of the disks D are held between the supporting members 21 and the holding pawls 22a, 23a, and 24a of the respective holding members 22, 23, and 24.

When the disks D are not provided for supporting members 21, the holding members 22 are pivoted counterclockwise and the holding members 23 are pivoted clockwise as when the disks D are held. However, for the supporting members 21 to which the disks D are not provided, as shown in FIG. 6, the holding members 24 are pivoted slightly clockwise from the disk holding positions shown in FIG. 7.

When a supporting member 21 in the disk accommodation area 20 is to be moved to the selection position (a), as shown in FIG. 2, the driving unit 50 is moved to the withdrawal position and the transfer unit 80 is moved toward the waiting position shown in FIG. 7.

At this time, as shown in FIG. 4, the driving member 62 is positioned closest to the Y2 side (in state (i) shown in FIG. 4), and a control pin 73a of the link 73 is positioned at an illustrated X2-side-and-Y2-side end defining an arcuate guide slot 41c formed in the unit supporting base 41. A link pin 73b of the link 73 is positioned at an illustrated X1-side end in a transmission cam 74b of the link 74, and the slide pin 101a of the lever 101 is positioned at an end defining a rotation control portion 74a1 of the slide groove 74a of the link 74. In such a state, the lever 101 is maximally rotated clockwise, so that the restricting protrusion 102 is at the position shown in FIG. 3A and restricts the restricting convex portion 90. Therefore, the movement of the driving unit 50 is restricted so as not to move from the withdrawal position shown in FIG. 2.

In this state, the annular gear, provided at the top surface 9, is rotated to rotate the selection shafts 31, 32, and 33 in synchronism. By the selection grooves 35 of the selection shafts 31, 32, and 33, the supporting members 21 are moved downward, and the supporting member 21 to be selected is stopped at the selection position (a).

As described above, when the desired supporting member 21 is being moved to the selection position (a), the restricting convex portion 90 and the restricting protrusion 102 oppose each other. Therefore, even if, for example, an external vibration is applied, the position of the driving unit 50 is reliably restricted, so that the driving unit 50 is reliably prevented from moving toward the driving position. As a result, the driving unit 50 is not moved forcefully or suddenly toward the driving position by an external force, such as external vibration, so that it is possible to prevent breakage of, for example, the driving mechanism, where the driving pin 63 is provided, used for pivoting the driving unit 50. In addition, it is possible to reliably prevent the driving unit 50 from colliding with the supporting member 21 that is moving to the selection position (a) and from interfering with the vertical movement of the supporting member 21. Further, it is possible to prevent breakage of the driving unit 50 and the supporting member 21 resulting from a collision.

When, as shown in FIG. 2, the driving unit 50 is at the withdrawal position, as shown in FIG. 1B, the lock member 46, which is provided at the inner side of the front surface 3, is moved in the direction X2, so that the lock shafts 44, which are provided at the front end of the unit supporting base 41, are held by the downward-movement lock portions 47a of the lock holes 47. The lock member 45, which is provided at the inner side of the rear surface 4 of the housing 2, is also moved in the direction X2, so that, similarly, the lock shaft 43, which is provided at the rear end of the unit supporting base 41, is held by the downward-movement lock portion of the lock member 45. Therefore, the unit supporting base 41 is moved downward so as to come close to the bottom surface 8, and is restricted.

The roller 67, which is provided at the front end of the driving unit 50, is caught by the secured guide edge 65a of the secured guide 65, which is provided with the unit supporting base 41. The feed screw shaft 58 is driven by the sled motor 59, which is provided with the driving unit 50, and the optical head 56 is stopped at its outer-peripheral-side position. The optical head 56 is separated from the turntable 55, and is stopped near the supporting shaft 52, serving as the rotational fulcrum of the driving unit 50.

With the driving unit 50 situated at the withdrawal position as shown in FIG. 2, since the optical head 56 is close to the supporting shaft 52, it is possible to reduce a moment acting upon the supporting shaft 52 by the mass of the optical head 56. Accordingly, since the mass of the driving unit is not concentrated at the rotational free end side and the roller 67 is caught by the secured guide 65, when an external force, such as vibration, acts upon the driving unit 50, it is possible to restrict rattling of the driving unit 50 vertically and horizontally (that is, in the X-Y plane) with respect to the supporting shaft 52 serving as a fulcrum.

When a disk D is inserted, the selection shafts 31, 32, and 33 are driven to move an empty supporting member 21 that does not hold a disk D to the selection position (a). When the empty supporting member 21 is stopped at the selection position (a), first, the driving member 62 is moved in the direction Y1 from the position (i) shown in FIG. 4 to the position (ii) shown in FIG. 4. By this movement, the control pin 73a of the link 73 is moved to a position indicated by dash lines in FIG. 4, so that the link 73 is rotated counterclockwise. This causes the link pin 73b of the link 73 to slide in the transmission cam 74b of the link 74 to a position indicated by dash lines in FIG. 4. By this movement, the link 74 rotates clockwise, and the slide pin 101a of the lever 101 slides in the rotation control portion 74a1 of the slide groove 74a of the link 74 and moves to a position indicated by alternate short and long dash lines in FIG. 4. As a result, the lever 101 rotates counterclockwise around the securing pin 103 serving as a rotational fulcrum, and the restricting protrusion 102 moves to a position indicated by alternate long and short dash lines in FIG. 4. Here, as shown in FIG. 3B and FIG. 5, the restricting protrusion 102 is accommodated in the cut portion 65b of the secured guide 65 so that it is separated from the outer periphery of the restricting convex portion 90. Therefore, the positional restriction on the restricting convex portion 90 is removed, thereby allowing the driving unit 50 to pivot toward the driving position. Since the restricting protrusion 102 is accommodated in the cut portion 65b, the restricting protrusion 102 is reliably separated from the outer periphery of the restricting convex portion 90, so that the driving unit 50 can reliably pivot toward the driving position.

As mentioned above, the restricting protrusion 102 is moved through the operation of the links 73 and 74 that operate the movable guide 71. Accordingly, since the movement of the restricting protrusion 102 and the operation of the movable guide 71 are performed through the operations of common members, that is, the links 73 and 74, it is possible to smoothly perform the operations of moving the restricting protrusion 102 to the position shown in FIG. 3B to remove the positional restriction on the driving unit 50, and, then, of moving the movable guide 71. The restricting protrusion 102 is moved by the rotation of the lever 101 linked to the links 73 and 74. Therefore, it is possible to move the restricting protrusion 102 by a simple mechanism.

The structure of the link mechanism that operates the movable guide 71 is not limited to that including the links 73 and 74 according to the embodiment, so that various related power transmitting mechanisms may also be used.

After removing the positional restriction on the driving unit 50 that is established by the restricting convex portion 90 and the restricting protrusion 102, the driving member 62 is further moved in the direction Y1 from the position (ii) shown in FIG. 4, so that, as shown in FIG. 5, the movable guide 71 rotates clockwise and stops at a position where it can guide the roller 67. Concurrently with this, the driving unit 50 pivots clockwise from the withdrawal position, and the roller 67 rolls while being guided along the secured guide edge 65a of the secured guide 65. Then, the roller 67 is separated from the secured guide edge 65a and is received by the movable guide edge 71a of the movable guide 71. Thereafter, the roller 67 rolls along the movable guide edge 71a of the movable guide 71. Then, when the driving unit 50 reaches the driving position shown in FIGS. 5 and 6, the movable guide 71 rotates further clockwise, so that the roller 67 is held by the holding recess 71b of the movable guide 71.

As mentioned above, the moving force of the driving member 62 that rotates the driving unit 50 moves the restricting protrusion 102 to the position shown by the alternate long and short dash lines in FIG. 4 and in FIG. 3B. That is, the moving force of the driving member 62 can easily and reliably move the restricting protrusion 102 and pivot the driving unit 50. Therefore, it is possible to easily and reliably control the movement of the restricting protrusion 102 and the pivoting of the driving unit 50 and to smoothly perform the operations of moving the restricting protrusion 102 to the position shown in FIG. 3B to remove the positional restriction on the driving unit 50, and, then, of pivoting the driving unit 50 toward the driving position. In addition, it is possible to use common members for moving the restricting protrusion 102 and for pivoting the driving unit 50, so that it is possible to reduce the number of parts, simplify the structure of the disk device 1, and reduce manufacturing costs.

While pivoting the driving unit 50 toward the driving position and after the driving unit 50 has reached the driving position, when insertion of a disk D is being awaited, the lock member 45 and the lock member 46 remain moved in the direction X2. In addition, as shown in FIG. 1B, the lock shafts 44 are restricted by the downward-movement lock portions 47a of the lock holes 47, and the lock shafts 43 and 45 are restricted by the downward-movement lock portions.

When the insertion of a disk D through the loading slot 11 is detected by an insertion detector (not shown), the roller motor 87 starts operating to drive the transfer rollers 83 and 84 in the transfer unit 80 in the direction in which the disk is transported into the housing 2. Then, the disk D is clamped by the transfer rollers 83 and 84 and the clamping member 85 and transported into the housing 2. When the disk D is transported into the housing 2 by a certain amount, the transfer unit 80 pivots from the waiting position shown in FIG. 7 to the transfer position shown in FIG. 6 to transport the disk D toward the supporting member 21 at the selection position (a). At this time, as shown in FIG. 6, the holding member 22 that is close to the loading slot 11 is pivoted clockwise and is oriented so as not to interfere with the transportation of the disk D into the housing 2.

When the disk D is supplied to the supporting member 21 at the selection position (a), the holding member 24 is pushed by the disk D and rotated counterclockwise to disengage the detection portion 24b of the holding member 24 from the loading detector 28, so that the detection output of the loading detector 28 is switched on.

When the detection output of the loading detector 28 is switched on, the lock member 46 shown in FIG. 1B is moved in the direction X1, so that the lock shafts 44 are guided to the lift-up portions 47b of the lock holes 47. Similarly, the rear lock member 45 is also moved in the direction X1, so that the lock shaft 43 is also lifted up by the lift-up portion of the lock member 45. Therefore, the unit supporting base 41 is lifted, so that the convex portion 55b of the turntable 55, provided with the driving unit 50, moves into the center hole Da of the disk D that is held by the supporting member 21 at the selection position (a), from below the center hole Da. Then, the clamp mechanism, which is provided with the turntable 55, operates so that the clamp pawl protrudes from the convex portion 55b of the turntable 55. The peripheral portion of the center hole Da of the disk D is clamped by the clamp pawl and the flange 55a of the turntable 55.

As mentioned above, when the convex portion 55b of the turntable 55 moves into the center hole Da of the disk D and when the clamp pawl clamps the disk D, the lock shafts 44 are restricted by the lift-up portions 47b of the lock holes 47 and the lock shaft 43 is similarly restricted by the lift-up portion. Therefore, the unit supporting base 41 is not subjected to the vibration-damping function by the dampers 48. In addition, at least until the convex portion 55b enters the center hole Da of the disk D, the optical head 56 is situated at its outer-peripheral-side position, so that vibration of the driving unit 50 is restricted.

Thereafter, while the transfer rollers 83 and 84 rotate in the direction in which the disk D is transported into the housing 2, the transfer unit 80 is restored to its waiting position shown in FIG. 7 from the transfer position shown in FIG. 6, and separates from the disk D. The lock member 46 shown in FIG. 1B moves further in the direction X1, so that the lock shafts 44 are guided to the escape portions 47c of the lock holes 47, thereby removing the restrictions on the lock shafts 44. This causes the unit supporting base 41 to be resiliently supported by the dampers 48. At the same time, the holding members 23 and 24 shown in FIG. 6 are rotated counterclockwise, so that the supporting member 21 lets go of the disk D.

This causes the disk D that is clamped by the turntable 55 to separate from the supporting member 21 at the selection position (a) in the downward direction, so that the disk D can be rotationally driven along with the turntable 55.

In the driving unit 50, before starting the rotation of the disk D on the turntable 55, the sled motor 59 moves the optical head 56 to its inner-peripheral-side position that is close to the turntable 55. A recording area containing table-of-contents (TOC) information at the inner periphery of the disk D is immediately read, and the optical head 56 moves toward the outer-peripheral-side position to read a signal recorded on the disk.

When the disk D whose rotational driving is ended is to be discharged, the rotation of the turntable 55 is stopped, and the lock members 45 and 46 are moved in the direction X2 to lift the unit supporting base 4 and to push the disk D that is clamped on the turntable 55 against the supporting member 21 at the selection position (a). Then, while rotating the transfer rollers 83 and 84 in the direction in which the disk D is transported out of the housing 2, the transfer unit 80 is moved to the transfer position shown in FIG. 6 to clamp the disk D with the transfer rollers 83 and 84 and the clamping member 85.

Then, the disk D on the turntable 55 is unclamped, and the lock members 45 and 46 are further moved in the direction X2, so that the lock shafts 44 are held by the downward-movement lock portions 47a of the lock holes 47 and the lock shaft 43 is similarly held by the downward-movement lock portion. Thereafter, the convex portion 55*b* of the turntable 55 is removed downward from the center hole Da of the disk D. Then, the transfer rollers 83 and 84 are rotated in the direction in which the disk D is transported out of the housing 2, and the transfer unit 80 is moved to the waiting position shown in FIG. 7, so that the disk D is discharged from the loading slot.

When the disk D that is held by the supporting member 21 in the disk accommodation area 20 is to be rotationally driven, the driving unit 50 is at the withdrawal position. While the transfer unit 80 is at the waiting position, the selection shafts 31, 32, and 33 are driven to move the supporting member 21 holding the disk D to the selection position (a). Then, the driving unit 50 is moved to the driving position shown in FIG. 5 to hold the disk D at the turntable 55.

As mentioned above, even when the supporting member 21 holding the disk D is to be moved to the selection position (a), the restricting protrusion 102 is moved to the position shown in FIG. 3A and opposes the restricting convex portion 90, so that movement of the driving unit 50 toward the driving position is restricted. Therefore, even if, for example, external vibration is applied, it is possible to reliably restrict the position of the driving unit 50 and to thus reliably prevent the driving unit 50 from moving toward the driving position. As a result, it is possible to prevent the driving unit 50 from being moved toward the driving position by, for example, external vibration, from colliding with the supporting member 21 that is moving or the disk D that is held by the supporting member 21, and from interfering with the movement of the supporting member 21. In addition, it is possible to prevent breakage of the driving unit 50 and the supporting member 21 resulting from the collision. Further, the driving unit 50 is not forcefully and suddenly moved toward the driving position by an external force, such as external vibration, so that it is possible to prevent breakage of, for example, the driving mechanism, where the driving pin 63 is provided, used for pivoting the driving unit 50.

Even when, for example, the disk device 1 is transported, the restricting protrusion 102 is moved to the position shown in FIG. 3A and opposes the restricting convex portion 90, so that movement of the driving unit 50 toward the driving position is restricted. As a result, the driving unit 50 is not moved to the driving position, so that it is possible to prevent the driving unit 50 from colliding with the supporting member 21 or the disk D that is held by the supporting member 21, and the driving unit 50 and the supporting member 21 or the driving unit 50 and the disk D from breaking.

Although, in the above-described embodiment, the selection grooves 35 of the selection shafts 31, 32, and 33 are used to lift the supporting members 21 and select a desired supporting member 21, the supporting-member-selecting mechanism is not limited to one using selection shafts having selection grooves 35. The supporting-member-selecting mechanism may be an alternative supporting-member-selecting mechanism that moves upward and downward shafts or protrusions protruding from the supporting members 21 by, for example, a link mechanism or cam grooves of a slide member.

Although, in the embodiment, the restricting mechanism 100 is formed by the restricting convex portion 90, the lever 101, and the restricting protrusion 102, the structure of the restricting mechanism is not limited thereto, so that another reciprocating mechanism may be used as the restricting mechanism. For example, a restricting mechanism including a restricting lever that reciprocates linearly in the Y1-Y2 directions shown in FIG. 2 or vertically may be provided.

The restricting mechanism is such that, when the driving unit 50 is at the withdrawal position, the restricting lever is moved to the restriction position opposing the left side surface (at the driving-position side) of the driving base 51, whereas, when the driving unit 50 is to be moved toward the driving position, the restricting lever is moved linearly to the restriction-removed position that allows movement of the driving unit 50. In this case, a motor serving as a driving source for reciprocating the restricting lever may be provided independently of the motor serving as the driving source for rotating the driving unit 50.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A disk device comprising:

a driving unit that is disposed in a housing and that moves between a withdrawal position and a driving position along a plane that is parallel to a surface of a disk that is positioned in the housing, the driving unit being spaced apart from an outer peripheral edge of a disk that is positioned in the housing when the driving unit is in the withdrawal position, and the driving unit being at a position where the disk is rotationally driven by the driving unit when the driving unit is in the driving position;

a restricting mechanism that moves between a restriction position and a restriction-removed position, the restriction position being where the movement of the driving unit at the withdrawal position toward the driving position is restricted, the restriction-removed position being where the driving unit at the withdrawal position is allowed to move toward the driving position; and a driving member that is disposed in the housing and that is moved by the power of a motor, wherein a moving force of the driving member moves the driving unit between the withdrawal position and the driving position and moves the restricting mechanism between the restriction position and the restriction-removed position;

wherein the driving unit moves from the withdrawal position to the driving position with a base portion of the driving unit being a rotational fulcrum, wherein the restricting mechanism comprises a restricting convex portion and a restricting protrusion, the restricting convex portion being provided at a free end side of the driving unit, the restricting protrusion moving between the restriction position opposing the restricting convex portion and the restriction-removed position separated from the restricting convex portion, and wherein the restricting protrusion obstructs the restricting convex portion to restrict the movement of the driving unit toward the driving position;

the disk device further comprising a movable guide having a movable guide edge that engages with the free end side of the driving unit and guides the free end side of the driving unit when the driving unit moves between the withdrawal position and the driving position, wherein the restricting protrusion moves between the restriction position and the restriction-removed position through a link mechanism that operates the movable guide.

2. The disk device according to claim 1, wherein the link mechanism is operated by the moving force of the driving member.

3. The disk device according to claim 1, further comprising a lever that is rotated by the link mechanism, wherein the restricting protrusion is provided at a rotational end of the lever, and wherein the link mechanism operates to rotate the lever, thereby moving the restricting protrusion between the restriction position and the restriction-removed position.

4. The disk device according to claim 1, further comprising a secured guide that catches and holds the free end side of the driving unit when the driving unit is at the withdrawal position, wherein, when the restricting protrusion is moved to the restriction-removed position, the restricting protrusion is accommodated in a recessed portion disposed in the secured guide.

5. The disk device according to claim 4, wherein the secured guide has a secured guide edge that is disposed along an arcuate locus whose center of curvature coincides with a rotational fulcrum of the driving unit, wherein the free end side of the driving unit at the withdrawal position is caught and held by the secured guide edge, and wherein the driving unit at the withdrawal position is rotated toward the driving position after being guided by the secured guide edge.

6. The disk device according to claim 5, further comprising a movable guide that guides the free end side of the driving unit that disengages from the secured guide edge of the secured guide and rotates toward the driving position, wherein the movable guide has a movable guide edge that is disposed along an arcuate locus whose center of curvature coincides with the rotational fulcrum of the driving unit, and wherein, when the driving unit rotates from the withdrawal position to the driving position, the free end side of the driving unit is received by the movable guide edge of the movable guide from the secured guide edge of the secured guide.

7. The disk device according to claim 6, wherein the movable guide has a holding recess that is disposed continuously with the movable guide edge, and wherein, when the driving unit is rotated to the driving position, the free end side of the driving unit is held by the holding recess.

8. A disk device comprising:
a plurality of supporting members that are disposed in a housing so as to overlap each other in a disk axial direction and that are capable of supporting disks;
a supporting-member-selecting mechanism that is disposed in the housing and that increases a distance between the supporting member that is selected and a supporting member adjacent thereto;
a driving unit that is disposed in the housing and that moves between a withdrawal position and a driving position along a plane that is parallel to a surface of a disk that is supported by a supporting member, the driving unit being spaced apart from an outer peripheral edge of a disk that is supported by a supporting member when the driving unit is in the withdrawal position, and the driving unit being at a position where a disk is rotationally driven by the driving unit when the driving unit is in the driving position; a restricting mechanism that moves between a restriction position and a restriction-removed position, the restriction position being where the movement of the driving unit at the withdrawal position toward the driving position is restricted, the restriction-removed position being where the driving unit at the withdrawal position is allowed to move toward the driving position; and
a driving member that is disposed in the housing and that is moved by the power of a motor, wherein a moving force of the driving member moves the driving unit between the withdrawal position and the driving position and moves the restricting mechanism between the restriction position and the restriction-removed position;
wherein the driving unit rotates from the withdrawal position to the driving position with a base portion of the driving unit being a rotational fulcrum, wherein the restricting mechanism comprises a restricting convex portion and a restricting protrusion, the restricting convex portion being provided at a free end side of the driving unit, the restricting protrusion moving between the restriction position facing the restricting convex portion and the restriction-removed position separated from the restricting convex portion, and wherein the restricting protrusion opposes the restricting convex portion to restrict the rotation of the driving unit toward the driving position;
the disk device further comprising a movable guide having a movable guide edge that engages with the free end side of the driving unit and guides the free end side of the driving unit when the driving unit rotates between the withdrawal position and the driving position, wherein the restricting protrusion moves between the restriction position and the restriction-removed position through a link mechanism that operates the movable guide.

9. The disk device according to claim 8, wherein the link mechanism is operated by the moving force of the driving member.

10. The disk device according to claim 8, further comprising a lever that is rotated by the link mechanism, wherein the restricting protrusion is provided at a rotational end of the lever, and wherein the link mechanism operates to rotate the lever, thereby moving the restricting protrusion between the restriction position and the restriction-removed position.

11. The disk device according to claim 8, further comprising a secured guide that catches and holds the free end side of the driving unit when the driving unit is at the withdrawal position, wherein, when the restricting protrusion is moved to the restriction-removed position, the restricting protrusion is accommodated in a recessed portion disposed in the secured guide.

12. The disk device according to claim 11, wherein the secured guide has a secured guide edge that is disposed along an arcuate locus whose center of curvature coincides with the rotational fulcrum of the driving unit, wherein the free end side of the driving unit at the withdrawal position is caught and held by the secured guide edge, and wherein the driving unit at the withdrawal position is rotated toward the driving position after being guided by the secured guide edge.

13. The disk device according to claim 12, further comprising a movable guide that guides the free end side of the driving unit that disengages from the secured guide edge of the secured guide and rotates toward the driving position, wherein the movable guide has a movable guide edge that is disposed along an arcuate locus whose center of curvature coincides with the rotational fulcrum of the driving unit, and wherein, when the driving unit rotates from the withdrawal position to the driving position, the free end side of the driving unit is received by the movable guide edge of the movable guide from the secured guide edge of the secured guide.

14. The disk device according to claim 13, wherein the movable guide has a holding recess that is disposed continuously with the movable guide edge, and wherein, when the driving unit is rotated to the driving position, the free end side of the driving unit is held by the holding recess.

* * * * *